(12) United States Patent
Metter et al.

(10) Patent No.: US 10,104,341 B2
(45) Date of Patent: *Oct. 16, 2018

(54) ANIMATED USER IDENTIFIERS

(71) Applicant: Google LLC, Mountain View, CA (US)

(72) Inventors: Koa Metter, Seattle, WA (US); Alan Lee Rogers, Seattle, WA (US); Jason Cornwell, Mountain View, CA (US); Richard Yuan-Ching Lo, Fremont, CA (US); Rachel Ilan Simpson, Munich (DE); Matthew Thomas Austin, Palo Alto, CA (US); Justin Uberti, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,795

(22) Filed: Dec. 14, 2017

(65) Prior Publication Data

US 2018/0109760 A1 Apr. 19, 2018

Related U.S. Application Data

(63) Continuation of application No. 15/387,401, filed on Dec. 21, 2016, now Pat. No. 9,871,996, which is a
(Continued)

(51) Int. Cl.
*H04N 7/15* (2006.01)
*G06T 13/40* (2011.01)
(Continued)

(52) U.S. Cl.
CPC ......... *H04N 7/157* (2013.01); *G06K 9/00228* (2013.01); *G06K 9/00268* (2013.01); *G06T 13/40* (2013.01); *H04N 7/147* (2013.01)

(58) Field of Classification Search
CPC combination set(s) only.
See application file for complete search history.

(56) References Cited

U.S. PATENT DOCUMENTS 8,325,213 B2 12/2012 Lamb et al.
8,874,665 B2 10/2014 Peterson et al.
(Continued)

OTHER PUBLICATIONS

Constantine, "Facebook Starts Letting You Add a 7-Second Looping Video as a Profile Pic", TechCrunch, AOL Inc., http://techcrunch.com/2015/09/30/facebook-profile-gif/, Sep. 30, 2015, 9 pages.
(Continued)

*Primary Examiner* — Joseph J Nguyen
(74) *Attorney, Agent, or Firm* — IP Spring

(57) ABSTRACT

Implementations relate to providing animated user identifiers. In some implementations, a computer-executed method includes determining that a video call over a communication network is connected between a first device associated with a first user and a second device associated with a second user. The method stores a set of multiple images that are received by the first device as part of the video call, and forms a motion clip including the set of multiple images and indicating a sequence of the set of multiple images for display. The method assigns the motion clip to a user identifier associated with the second user, and causes display of the motion clip to visually represent the second user in response to the user identifier being displayed in at least one user interface on the first device.

20 Claims, 7 Drawing Sheets

Related U.S. Application Data continuation of application No. 15/153,681, filed on May 12, 2016, now Pat. No. 9,532,004.

(51) Int. Cl.
    *G06K 9/00*     (2006.01)
    *H04N 7/14*     (2006.01)

(56) References Cited

U.S. PATENT DOCUMENTS

| | | |
|---|---|---|
| 2004/0179039 A1 | 9/2004 | Blattner et al. |
| 2004/0246951 A1 | 12/2004 | Parker et al. |
| 2007/0168863 A1 | 7/2007 | Blattner et al. |
| 2007/0186002 A1 | 8/2007 | Campbell et al. |
| 2008/0030496 A1 | 2/2008 | Lee et al. |
| 2008/0250066 A1 | 10/2008 | Ekstrand et al. |
| 2008/0284841 A1 | 11/2008 | Modai et al. |
| 2009/0263028 A1* | 10/2009 | Kwon ................ G06K 9/036 382/224 |
| 2010/0159909 A1 | 6/2010 | Stifelman |
| 2012/0013704 A1 | 1/2012 | Sawayanagi et al. |
| 2012/0052850 A1 | 3/2012 | Martin et al. |
| 2012/0212568 A1* | 8/2012 | Bang ................ H04N 1/00307 348/14.02 |
| 2014/0185609 A1 | 7/2014 | Efrati et al. |
| 2014/0245180 A1 | 8/2014 | Kuramura et al. |
| 2014/0320591 A1 | 10/2014 | Baron, Jr. et al. |
| 2015/0042747 A1 | 2/2015 | Won |
| 2015/0254281 A1* | 9/2015 | Sauve ............... G06F 17/30268 348/239 |

OTHER PUBLICATIONS

USPTO, Notice of Allowance for U.S. Appl. No. 15/387,401, dated Oct. 12, 2017, 17 pages.
USPTO, Notice of Allowance for U.S. Appl. No. 15/153,681, dated Aug. 26, 2016, 19 pages.
USPTO, International Search Report for International Patent Application No. PCT/US2016/068425, dated Mar. 29, 2017, 3 pages.
USPTO, First Action Interview, Pre-Interview Communication for U.S. Appl. No. 15/387,401, dated Jul. 19, 2017, 5 pages.
USPTO, Written Opinion for International Patent Application No. PCT/US2016/068425, dated Mar. 29, 2017, 7 pages.
USPTO, International Preliminary Report on Patentability for International Patent Application No. PCT/US2016/068425, dated May 1, 2018, 20 pages.

\* cited by examiner

ANIMATED USER IDENTIFIERS

CROSS REFERENCE TO RELATED APPLICATIONS

The present application is a continuation of U.S. patent application Ser. No. 15/387,401, filed Dec. 21, 2016 and titled ANIMATED USER IDENTIFIERS, which is a continuation of U.S. patent application Ser. No. 15/153,681, filed May 12, 2016 and titled ANIMATED USER IDENTIFIERS, the contents of both of which are incorporated herein by reference in their entirety.

BACKGROUND

The popularity and convenience of digital devices as well as the widespread of use of Internet communications have caused digital images and videos to become ubiquitous. Users of digital devices engage in many different forms of communication, including text chat, email, voice calls, and video calls. For example, video calls can be established between devices to provide, to the participants of the call, audio communication as well as video images depicting the participants.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of the present application relate to providing animated user identifiers. In some implementations, a computer-executed method includes determining that a video call over a communication network is connected between a first device associated with a first user and a second device associated with a second user. The method stores a set of multiple images that are received by the first device as part of the video call, and forms a motion clip including the set of multiple images and indicating a sequence of the set of multiple images for display. The method assigns the motion clip to a user identifier associated with the second user, and causes display of the motion clip to visually represent the second user in response to the user identifier being displayed in at least one user interface on the first device.

Various implementations and examples of the method are described. For example, the set of multiple images can be stored based on a time period during the video call when the set of multiple images were received. The set of multiple images can be received within a particular time period from the start of the video call. The set of multiple images can be a subset of a plurality of images that are received by the first device as part of the video call.

In various implementations, the method can further include automatically selecting the set of multiple images from the plurality of images received in a time period of the video call having a particular duration and occurring during a particular time period in the video call. The method can include automatically selecting the set of multiple images from the plurality of images based on a detection of one or more types of content features depicted in the set of multiple images, where the one or more types of content features include faces. The selection of the set of multiple images can be based on a detection of one or more visual characteristics of the plurality of images, where the one or more visual characteristics include at least one of brightness and sharpness. The selection of the set of multiple images can based on suitability of the set of multiple images as a loop as indicated by a difference in visual content between a first image and a last image of the sequence of the set of multiple images. For example, the selection based on suitability as a loop can include determining the difference between the first image and the last image of two or more candidate image sequences formed from the plurality of images, and selecting the set of multiple images as one of the candidate image sequences having a lower difference between the first image and the last image.

The method can further include receiving a permission indication from the second device, where the permission indication permits the first device to store images from at least a portion of the video call. Causing a display of the user identifier can include looping the display of the sequence of the plurality of images when displaying the user identifier such that a first image in the sequence of the set of multiple images is displayed after the last image in the sequence of the set of multiple images. Forming a motion clip can include setting a display rate of the motion clip to be different than a display rate of the video call, and/or modifying a visual appearance of at least some images of the set of multiple images to be different than a visual appearance of the at least some images as displayed during the video call.

The method can further include determining whether an override clip is received by the first device, the override clip including a second set of multiple images to be displayed in a sequence, and in response to receiving the override clip, the override clip is assigned to the user identifier of the second user. The method can include determining a score associated with the set of multiple images based on one or more image characteristics of one or more of the set of multiple images, and comparing the score of the set of multiple images of the motion clip to a score assigned to a previous sequence of images stored from a previous video call that included the second user. The previous sequence of images was previously assigned to the user identifier of the second user on the first device. The method can include replacing the previous sequence of images with the motion clip as the user identifier of the second user in response to determining that the score associated with the motion clip is better than the score associated with the previous sequence of images.

In some implementations, a computer readable medium can have stored thereon software instructions that, when executed by a processor, cause the processor to perform operations. The operations include determining at a first device that a video call over a network is connected between the first device associated with a first user and a second device associated with a second user, and receiving a permission indication from a different device over a communication network that permits the device to store images from at least a portion of a video call. The operations include storing a set of sequential images that are received by the first device as part of the video call, where the set of sequential images is a subset of a plurality of images received as part of the video call. The operations include assigning the set of sequential images to a user identifier associated with the second user, and causing a sequential display of the set of sequential images as the user identifier to visually represent the second user on the first device in one or more displayed user interfaces on the first device.

Various implementations and examples of the computer readable medium are described. For example, the user identifier can be displayed in a contact list on the first device, and the operations can further include receiving a selection of the displayed user identifier by the first user of the first device and initiating a video call to the second user. The operations can further include automatically selecting the set of sequential images from the plurality of images based on the sequential images occurring in a particular time period of the video call and having a particular duration, based on a detection of one or more types of content features depicted in the set of sequential images, and/or based on suitability of the set of sequential images as a loop as indicated by a difference in visual content between a first image and a last image of the set of sequential images.

In some implementations, a device includes a storage device, a display, and at least one processor coupled to the display, configured to access the storage device, and configured to perform operations including storing a set of multiple images that are received by the device as a part of a video call over a communication network between the device associated with a first user and a different device associated with a second user, where the set of multiple images is a subset of a plurality of images received as a part of the video call. The operations include associating the set of multiple images with a user identifier associated the second user, and causing a sequential display of the images in the set of multiple images as the user identifier to visually represent the second user on the first device in at least one user interface on the first device.

Various implementations and examples of the device are described. For example, the processor can further perform operations including automatically selecting the set of multiple images from the plurality of images based on the multiple images occurring in a particular time period of the video call and having a particular duration, based on a detection of one or more types of content features depicted in the set of multiple images, and/or based on suitability of the set of multiple images as a loop based on a difference in visual content between a first image and a last image of a sequence of the set of multiple images. The processor can further perform operations including modifying the set of multiple images for use as the user identifier, where the modifying can include setting a display rate of at least some images of the set of multiple images to be different than a display rate of the video call, and/or modifying a displayed visual appearance of at least some images of the set of multiple images to be different than a visual appearance of the set of multiple images as displayed during the video call.

DETAILED DESCRIPTION

Figure 1:
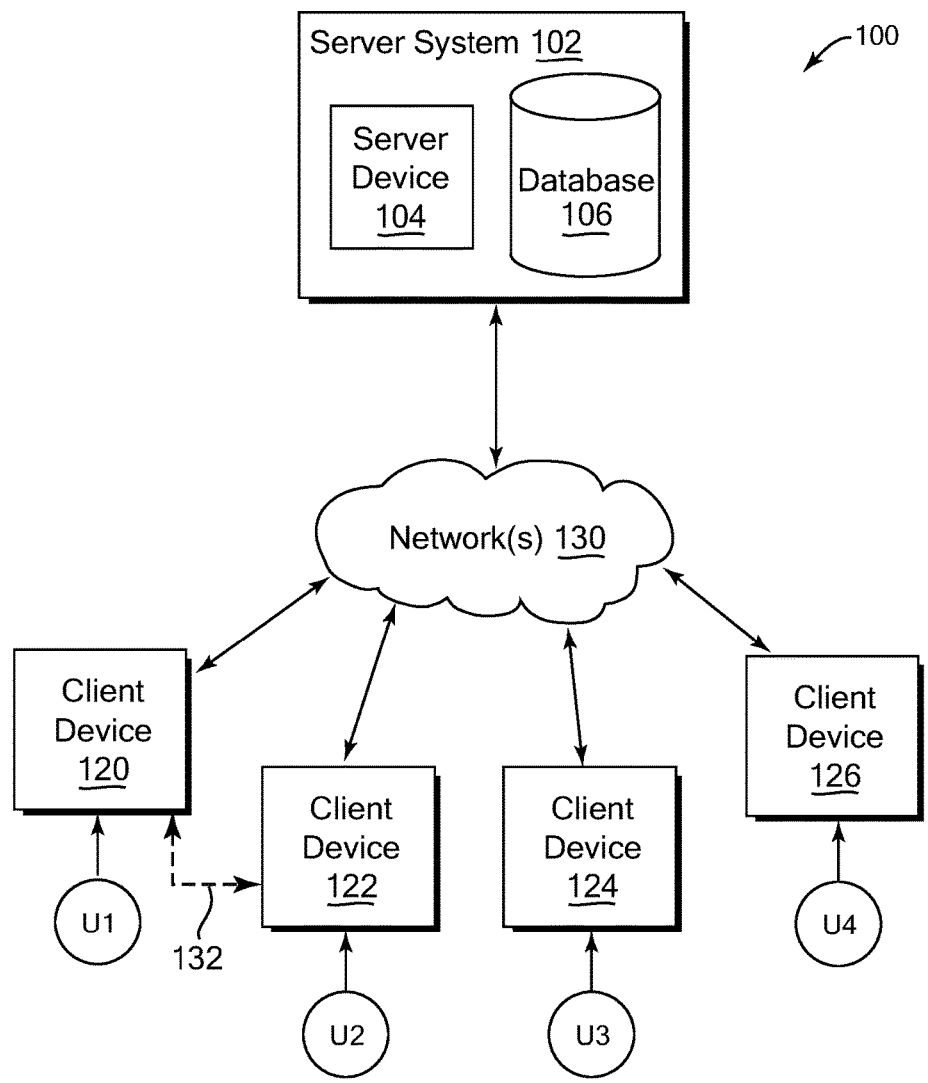
FIG. 1 is a block diagram of an example network environment which may be used for one or more implementations described herein.

One or more implementations described herein relate to providing animated user identifiers in user interfaces of devices. In some implementations, a system can store a set of multiple images received by a first device from a second device communicating with the first device as part of a video call. The images are stored if permission is received from a second user of the second device. For example, the images can depict the second user communicating in the video call. The set of images can be automatically formed into a motion clip that is assigned to a user identifier associated with the second user and which can be used to visually represent the second user, e.g., in displayed contact lists, communication interfaces, other user interfaces, etc. The motion clip is displayed by the first device for the user identifier in one or more user interfaces, where the motion clip is displayed as sequential images providing an animation of the second user or other subject.

The set of images that are stored and formed into the motion clip can be based on a time period during the video call when the images were received. For example, images in a particular time period from the start of the video call can be stored, e.g., the first 5 seconds, 10 seconds, or other time period. The set of images stored for the motion clip can be a selected subset from multiple images received as part of the video call, where multiple candidate subsets of the multiple images can be evaluated. For example, the set of images can be selected from the multiple images based on one or more characteristics, including duration (e.g., displayed for a particular number of seconds), occurrence during a particular time period (e.g., beginning, middle, or end of call, etc.), type of content features depicted in the set of images (e.g., a face having a front orientation), visual characteristics of the set of images (e.g., brightness, contrast, sharpness/blurriness, etc.), etc. In some examples, the criteria can include whether the set of images is suitable to be displayed as a loop, e.g., where the first image in the sequence of images is displayed next after the last image in the sequence, and where the first image has small visual difference in visual content to the last image. A selected motion clip can be modified in some implementations, e.g., its display rate set to be different than the display rate of the video call, and/or its visual appearance modified to be different than the visual appearance of the images when as received as part of the video call.

In some implementations, the motion clip can be displayed as a repeating loop of the sequence of images for the user identifier of the second user. Some implementations can determine whether an override clip has been received by the first device, e.g., from the second user, such that the override clip is assigned to the user identifier of the second user and includes a particular set of images to be displayed in a sequence. User identifiers can be displayed, for example, in a contact list on the first device, where a selection of a user identifier by the first user causes a video call to be requested to the associated user. User identifiers can also be displayed in other user interfaces, e.g., for communication applications and other applications, associations with user content, etc.

One or more features described herein allow animated user identifiers to be automatically determined and displayed to represent users in displayed interfaces of devices. The animations can be determined automatically based on images received in video calls with the associated users. Such features allow relevant and descriptive user identifiers to be assigned to the contacts in a user's contact list without the user having to manually assign particular images to contacts. High quality and desirable portions of a video call can be automatically selected to visually portray the user identifiers, if permission is received from the users being represented by the user identifiers. Furthermore, described features allow the animated user identifiers to be distinguishable from video calls and other video feeds and data, e.g., by setting the display rate and/or visual appearance of the animations to be different than the video data. Some features allow animations to be provided for the user identifiers to distinguish particular contact users from other contact users, e.g., based on the status of contact users with respect to the user of the device.

Described features can provide clear presentation and allow efficient selection of user contacts in user interfaces of devices. Images depicting the associated users can be automatically assigned to appropriate contacts and animations can allow the displayed user identifiers to be clearly noticed and selected in the interface by users. Animations can be varied to indicate user contacts of varied importance to the user. Described features can allow a device to provide visually relevant user contacts without the significant time and processing required from the user manually searching for and assigning images to user contacts. Consequently, a technical effect of one or more described implementations is that search, organization, access, and presentation of user identifiers is reduced in computational time and resources expended to obtain results. For example, a technical effect of described features is a reduction in the problem of consumption of system processing resources required for search and display of user identifiers for particular users that may otherwise be used by a system to provide manual searching for user contacts and for relevant data to assign to user contacts.

An "image" as referred to herein can be a still image, single image, or standalone image, or can be an image included in a series of images, e.g., a frame in a video sequence of video frames, or an image in a different type of sequence or collection of images. For example, various implementations described herein can be used with single images (photos) or with one or more images in a sequence or in a video.

One or more systems and methods discussed herein do not require collection or usage of user personal information. In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., a desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some example implementations, users U1, U2, U3, and U4 may interact with each other via applications running on respective client devices and/or server system 102. In some implementations, the interaction may be performed via a network service, e.g., a social network service or other type of network service implemented on server system 102. For example, respective client devices 120, 122, 124, and 126 may communicate data to and from one or more server systems (e.g., system 102). In some implementations, server system 102 may provide appropriate data to the client devices such that each client device can receive communicated content or shared content uploaded to the server system 102 and/or network service. In some examples, the network service can include any system allowing users to perform a variety of communications (e.g., voice calls, video calls, chat, messaging, etc.), form links and associations, upload and post shared content such as images, video, audio, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images, video sequences, audio sequences or recordings, or other types of content for access by designated users or sets of users of the network service, participate in live video, audio, and/or text chat with other users of the service, etc. Voice calls, video calls, and other communications can be provided using known protocols, e.g., Session Initiation Protocol (SIP) or other VOIP protocols, cell phone networks, Public Switched Phone Network (PTSN), etc., or customized protocols for particular applications. In some implementations, a "user" can include one or more programs or virtual entities, as well as persons that interface with the system or network.

A user interface can enable display of images, video data, and other content as well as communications, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, such as a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide one or more communication applications. A communication application may provide one or more communication functions. For example, the functions can include allowing a device to initiate and receive calls with other devices, communicate data with other devices over the network 130, e.g., in chats, voice calls, video calls, etc. The communication application can output related data including communication controls, contact lists, user identifiers, text and video, etc. The communication application can provide an associated user interface that is displayed on a display device associated with the server system or client device. The user interface may provide various functions for the communication application, allowing the user to select and control available functions.

Other implementations of features described herein can use any type of system and/or service. For example, photo collection services or other networked services (e.g., connected to the Internet) can be used instead of or in addition to a social networking service. Any type of electronic device can make use of features described herein. Some implementations can provide features described herein on client or server devices intermittently connected to computer networks. In some examples, a client device including or connected to a display device can process and display data stored on storage devices local to the client device (e.g., not connected via a communication network) and can provide features and results as described herein that are viewable to a user.

Figure 2:
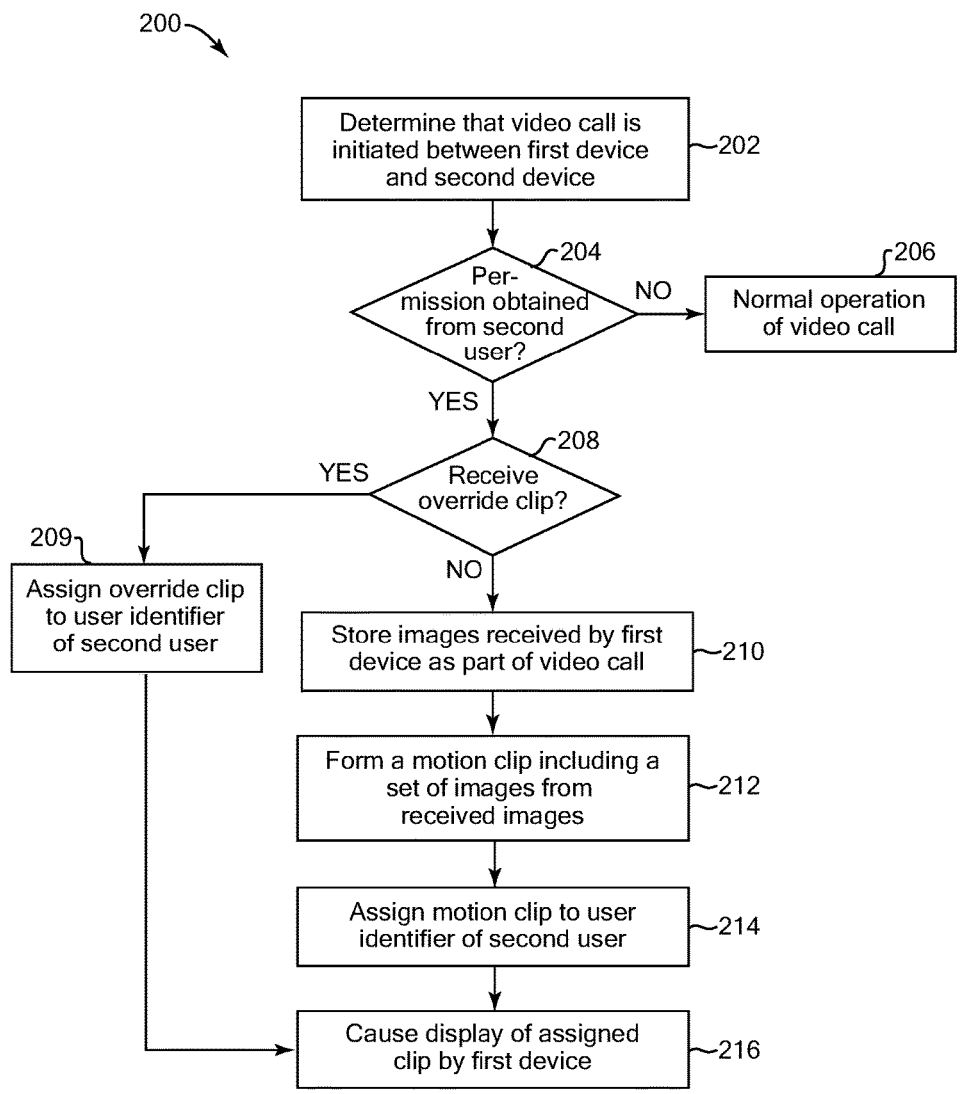
FIG. 2 is a flow diagram illustrating an example method to provide animated user identifiers on a device, according to some implementations.

FIG. 2 is a flow diagram illustrating one example of a method 200 to provide animated user identifiers on a device. Some or all of the method 200 can be implemented, for example, on a system such as one or more client devices 120, 122, 124, or 126 as shown in FIG. 1. In some implementations, method 200 can be implemented on a server system 102 as shown in FIG. 1, and/or on both a server system and a client system. In described examples, the implementing system includes one or more processors or processing circuitry, and one or more storage devices such as a database 106 or other storage. In some implementations, different components of one or more servers and/or clients can perform different blocks or other parts of the method 200.

An image as described herein can be a digital image composed of multiple pixels, for example, and a video can be composed of multiple images (e.g., frames) typically having a sequence of display. Images or video as described herein can be stored on one or more storage devices of the implementing system or otherwise accessible to the system, such as a connected storage device, e.g., a local storage device, remote storage device connected to or in communication with a network accessible to the first device, etc.

In block 202, it is determined that a video call is connected between a first device and a second device. For example, the first and second devices can be devices operative to communicate with each other over a network, e.g., client devices and/or server devices as in examples described above. In some examples, the first device and second device can be portable devices, e.g., smart phones, tablets, goggles, glasses, or other wearable devices, etc. In additional examples, either or both of the first and second devices can be non-portable, e.g., desktop devices, televisions, set-top boxes, or other devices. Two devices are described for the video call in examples herein. In some implementations, the video call can be determined to be initiated between more than two devices, e.g., a conference call or other multi-party call.

The video call is a communication between the two devices in which images are to be captured over time at the first and second devices (or at only the second device) by a camera component of the devices. The captured images are transmitted to the other device as part of the video call. In some examples, the video call can include video and audio components, where audio data is also captured at the first and second devices (or at one of the devices) from microphone(s) of the devices. In this example, video data is transmitted in the form of the captured images and audio data is transmitted from each device to the other, remote device. In some examples, visual images can be displayed on each of the devices that typically depict the face of the remote user talking, and synchronized audio output at each of the devices provide the speech of the remote user. In other examples, the face of the user may not be depicted in the transmitted images of the video call, and a video or animation depicting a different object, scene, or other features can be transmitted. For example, a captured scene not showing a user, a scene from a movie, an animated logo or advertisement of an organization, etc. may be transmitted from a device.

In the example of FIG. 2, the method 200 can be implemented from the point of view of the first device, where the first device is the local device and the second device is the remote device in the video call. Method 200, and/or various implementations thereof, can be implemented on any or all of the devices in the video call and/or on other devices, e.g., a connected server system.

The video call can be initiated by any of the devices included in the video call. In one example, the first device can initiate the call (e.g., send a call request to the second device) in response to a user (e.g., first user) of the first device selecting a displayed user identifier, e.g., in a contact list displayed on the first device. The user identifier (which can also be known as a contact avatar in some implementations or applications) visually represents a second user of the second device, and the selection of the second user's user identifier can instruct the first device to request a video call with the second device over the network based on stored address information associated with the selected user identifier and/or second user. For example, the stored address information can be an email address, telephone number, information identifying an account of the second user stored at a server or network service, or other address information. The second device is routed the call request based on the address information. In various implementations, the second user can decide to answer the call request (e.g., select to receive the call) to connect (e.g., establish) the video call, the video call can be automatically answered and connected, or other techniques can be used to connect the video call.

In block 204, it is determined whether permission (e.g., consent) has been received from the second user to allow the first device to store and/or use user data from the video call (and any other personal information) associated with the second user. Block 204 can additionally be performed at any time of method 200. For example, the second user has the option to prohibit other devices from storing and/or using images that are sent by the second device in a video call, and prohibit other devices from using these images by other devices. The second user also can prohibit other uses of personal information or user data related to the second user, e.g., face recognition of the second user, image recognition used on images received from the second user or second device, retrieval and/or use of other second user data as described above, etc. (The first user similarly has these permission options with respect to images depicting the first user and other user data related to the first user for use at the second device, first device, and other devices.) In various implementations, the permission option selected by the second user can be received at the first device as an indication of permission for the video call, e.g., as data over the network and before the video call is connected. For example, some implementations can prompt the second user for permission before each video call is begun. In some implementations, the permission preferences of the second user may already be stored by the first device based on a previous video call, and/or can be accessed by the first device on a server or other device over the network. For example, such permission preferences can be accessed to determine whether the second user provides permission to store and use images received in the video call. Some implementations can receive an indication of permission at different times or multiple times in method 200. For example, if an indication of permission indicates that no permission is provided from the second user, and this indication is received at a time after the video call has been initiated and one or more images from the second device have been stored at the first device, then any stored images from the video call are deleted from storage of the first device. Block 204 also checks whether permission has been received from the first user as to allow use of user data of the first user in the operations and blocks described herein.

If the users have not provided permission to use the images sent by the second device as part of the video call, then the method continues to block 206, in which normal operation of the video call is performed. This result prevents the creation and use of an animated user identifier based on the video call as described for blocks 210-216. In some implementations of a standard video call, no images received from the second user are stored for the first device.

Block 208 can be performed if permission has been obtained from the users in block 204. In block 208, it is determined whether an override clip has been received from the second user, e.g., from the second device or from another device in communication with the first device. An override clip is a set of images to be displayed as an animated user identifier of the second user, and can be similar to the motion clip described herein. For example, the override clip can be a video, animation, etc. The override clip can be defined by the second user, e.g., the particular images included in the override clip. The second user is thus able to provide animated user identifiers that the second user would like displayed for the user identifier of the second user on other devices. In various implementations, the override clip can be a clip of video frames or images that provide an animation. If an override clip is not received, then the method continues to block 210, described below.

If an override clip has been received, then the method continues to block 209, in which the override clip is assigned to the user identifier of the second user. The override clip is a motion clip that replaces any existing motion clip previously assigned to the user identifier of the second user. The override clip is displayed in a user interface in block 216 similarly as an assigned motion clip, described below. An override clip, for example, is preferred by the second user to be displayed to represent the second user on other devices. In some implementations, the override clip can be received at any time during the method 200 or at other times, and block 209 can be performed in response to receiving the override clip at such a time.

If the second user has provided permission to use the images sent by the second device during the video call, and if no override clip has been received, then in block 210, multiple images (e.g., frames) received by the first device from the second device as part of the video call (e.g., as the visual component of the video call) are stored for the purpose of determining an animated user identifier as described herein. For example, the images can be stored automatically (without user input or intervention) during or after the video call.

In some implementations, the stored images are sequential images received during the video call. Some implementations can store images that may not have been received sequentially, e.g., spaced apart by one or more other images received as part of the call that are not for use by method

200. For example, every Nth image can be stored. In some implementations, a number of images having a particular (e.g., predetermined) duration and occurrence during a particular time period in the video call are stored in block 210. For example, the first 30 seconds of the call, the last 30 seconds of the call, every other received image, or images at other specified time periods (e.g., middle, beginning, end, start of second half or other particular portion of the call duration, etc.) can be stored. In some implementations, it may be known from several previously conducted tests that users general prefer their appearances in a particular period of time of any video call, e.g., at the beginning of the video call, and image from such a time period can be stored in block 210.

The received images may depict any person, object, scene, logo, or other visual representation. For example, the face of the second user can be depicted in the received images showing the second user's appearance during the call. In other cases or implementations, the received images can depict any object or scene that the second user is directing the camera of the second device to capture during the video call. In some implementations, a video feed from another source can be inserted into the video call so that the received images depict any other subject, e.g., any previously-captured video data, a scene from a movie, an animation of a logo, fictional character, cartoon, drawing, etc.

Audio data can also be received as part of the video call, e.g., which can be associated with the received visual images. For example, audio data can be synchronized with images that were captured at the same time, e.g., particular audio data providing speech of the second user can be synchronized with the images depicting the second user providing that speech. In some implementations, the audio data is not stored for the use of creating a user identifier as described herein, e.g., the user identifier does not have associated audio output. In other implementations, the first device can store the audio data associated with stored images and can include output of the audio data with the display of the user identifier. Some implementations can provide other types of data in the video call, e.g., haptic feedback data, which can be associated with a corresponding animated user identifier and output by the device (e.g., using actuator(s) of the device) in correspondence with the display of the user identifier in some implementations.

In block 212, a motion clip is formed including a set of images, where the set of images include multiple images of the images stored in block 210. For example, a motion clip can include (e.g., indicate or designate) particular images from the video call to be displayed in a defined sequence. In some examples, the motion clip can be a portion of recorded video, an animation, or other set of images. In some implementations, all the stored images from block 210 are used as the set of images in the motion clip. Some implementations can select a subset and/or portion(s) of the stored images to use as the set of images in the motion clip. Some examples of selecting images for the motion clip are described with reference to FIG. 3.

The motion clip can also describe display characteristics of the set of images. For example, in some implementations, display settings can be stored in association with data defining the motion clip. The display settings can include a designated duration that each image in the sequence is displayed, e.g., a display rate (such as a display frame rate) or a display time of the motion clip. A specified display rate or time can apply to all images, and/or an individual display rate or time can be designated for individual images or particular groups of images of the set of images. For example, the images in the motion clip can be specified to be displayed for equal durations, or for unequal durations, e.g., some images displayed longer than others during the display sequence.

In some implementations, the display settings can include a particular display rate of the set of images that is different from an existing display rate. For example, if a number of sequential images from the video call are selected for the motion clip, those images had a existing display rate for the video call. This display rate can be changed in the motion clip, e.g., to be faster or slower than the display rate during the video call. In some examples, the display rate can be changed to be different (e.g., faster or slower) than the display rate of the video call by a threshold amount or more. As with some modifications described above, such display rate differences can be used to help visually distinguish a displayed user identifier from a video call in a displayed user interface. In some implementations, the display rate can be adjusted to multiple different magnitudes within the single motion clip, e.g., the first portion of the sequence designated to be displayed at one rate, a second portion at a different rate, etc. Some implementations can indicate a display rate by indicating a display duration for the images, or for individual images or groups of images, of the motion clip.

Another example of display settings include a setting indicating whether the set of images are to be looped when displayed, e.g., whether the display of these sequential images is to return to the beginning image of the sequence after the final image of the sequence has been displayed, or whether the display of the set of images stops after the display of the final image. Some settings can specify a particular number of loops that the set of sequential images is to be displayed, or can specify continuous looping with no stopping.

Figure 3:
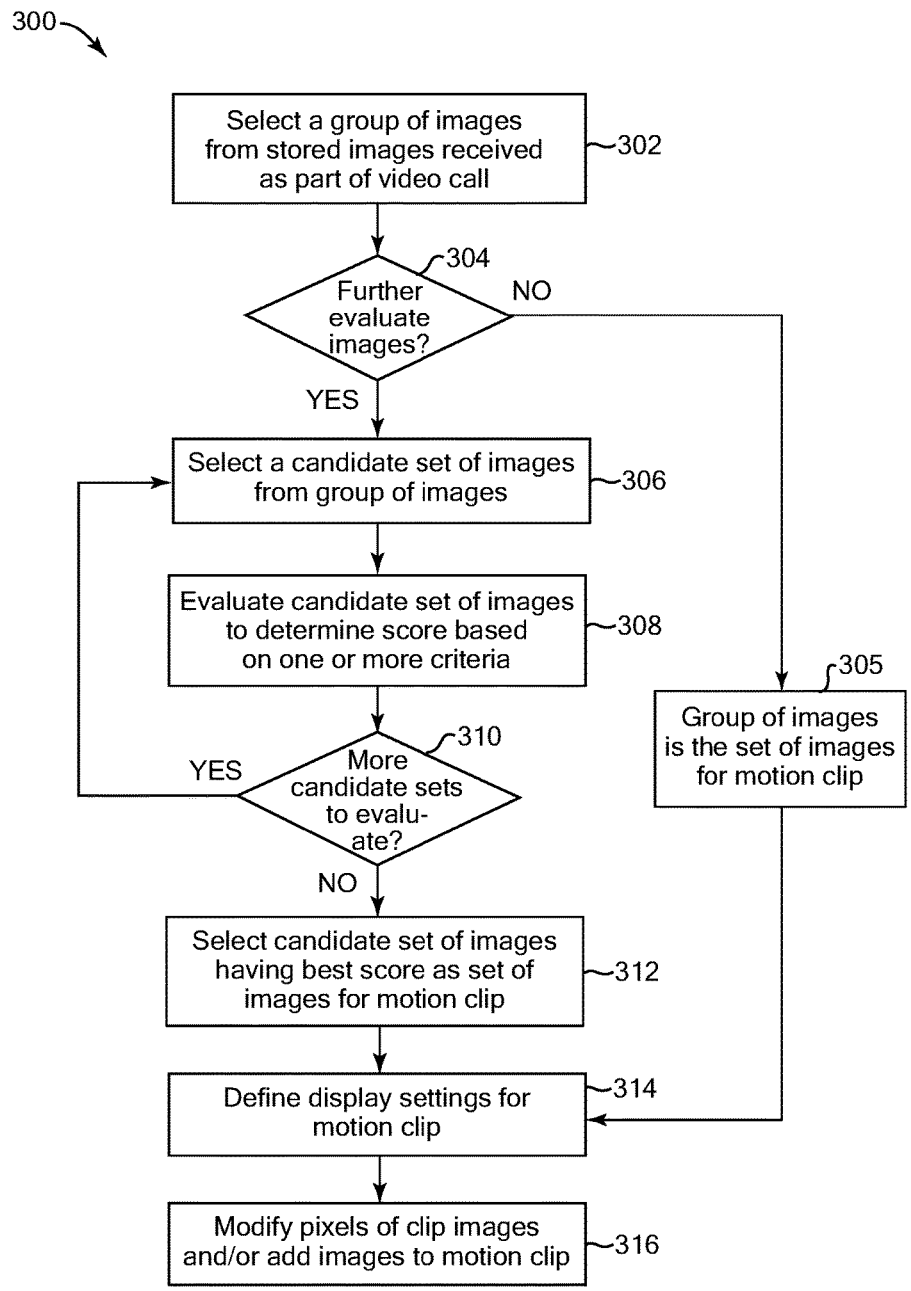
FIG. 3 is a flow diagram illustrating an example method to select a set of images to be included in a motion clip used for a user identifier, according to some implementations.

Some implementations can modify one or more images of the motion clip and/or add one or more images to the motion clip, some examples of which are described with respect to FIG. 3.

Various settings stored in association with the motion clip can be changed during a particular display of the motion clip, e.g., as specified by user preferences, user input, settings of an application providing the display, etc.

In block 214, the motion clip of block 212 is assigned to a user identifier that is associated with the second user. A user identifier identifies a person, e.g., a user of a device. In some implementations, the user identifier can identify an entity or organization, e.g., represented by a person. In some implementations, the user identifier can be a contact identifier that, for example, identifies a user who was previously, is currently, or prospectively will be contacted by the first user, e.g., in a device communication, or a user whose communications, contributions, presence, participation, or association (e.g., in forums, websites, network services, other received or accessible information, etc.) can be viewed by the first user. In some implementations, the user identifier can be used to visually represent the associated user in a display. For example, a displayed user identifier can visually indicate association of the associated user with displayed data, displayed communications, displayed product, service, or organization, etc. Some implementations can use the user identifier to visually indicate the associated user in a user interface, e.g., in a displayed window, list (e.g., contact list, listing of users in a group, etc.), menu, or other interface element, or to indicate the user as a selectable item in an interface, etc. In some implementations, a user identifier can be used in a variety of different functions and/or applications used by a device, some examples of which are described below.

In some implementations, the system implementing method 200, e.g., the first device, can automatically assign the motion clip to the user identifier of the second user during or after the video call with the second user. In some implementations, the system can determine whether to replace a previously-assigned motion clip (or other data) with the motion clip determined in block 212. Some examples of assigning the motion clip to the user identifier are described with reference to FIG. 4.

In block 216, a display of the assigned motion clip is caused on the first device, as the user identifier of the second user. Block 216 can be performed at any time, e.g., in response to display conditions that allow the user identifier to be displayed. Some examples of display of user identifiers are described below with reference to FIGS. 5-8. In some implementations, the user identifier can be displayed in one or more user interfaces on the first device to visually represent the second user. For example, the user interfaces can be used in one or more communication functions and/or other functions provided by the first device.

In some examples, the described user identifier can be displayed with other user identifiers in response to the first user inputting a command to display a contact list, other list or group, or menu of user identifiers available on the first device. For example, the first user may command to display available user identifiers in a call list to determine which user to call. Selecting such a displayed user identifier by the user initiates a call to the represented user. In some implementations, a user selection of a displayed user identifier may be a request to display additional information about the associated user, which can be performed by the device if consent has been obtained from the associated user for retrieval and/or display of such information. For example, information about the second user can be stored by the first device or retrieved from an associated user account in remote storage (if consent has been obtained from the second user). Such information can include the address of the second user, contact information, current user status, etc. The selection of the user identifier can be determined from user input provided in any of a variety of forms, e.g., a user touch on a touchscreen of the first device, a pointing device (e.g., trackpad, mouse, stylus, etc.), voice command that indicates the associated user's name or identification, etc.

In some implementations, the described user identifier can be displayed on a main screen or background of an operating system or graphical environment displayed by the first device. For example, one or more user identifiers may be displayed on a main screen for convenient selection for the user to initiate a call.

Some implementations can display a described user identifier in any list, menu, or other grouping in which a target user can be selected. For example, if the user wishes to form a social group on a network service, a list of possible users to include in the group (e.g., based on existing social groups of the first user, previous communications provided by the first device, etc.) can be displayed as a list of user identifiers. The first user can select user identifiers of users desired to be included in the social group. Similarly, if the first user is sending an electronic message (e.g., email or instant message), user identifiers of possible recipient users for the message can be displayed in a menu for selection by the first user.

A described user identifier can also be displayed, in some implementations, to represent the associated user as the originator or user associated with particular content or data displayed on the device. For example, if the first device receives a call request from the second user (e.g., for a video call, voice call, text chat, etc.), the user identifier can be displayed on the first device to indicate who is sending the call request to the first device. In another example, an image shared by the second user to the first device over the network can be visually displayed in association with (e.g., adjacent to) the user identifier of the second user, thus indicating who shared the image. In a calendar or event list, a user identifier can be displayed in association with (e.g., adjacent to) an event being provided by or coordinated by the associated user. A user identifier can be displayed in association with user content, e.g., to indicate who authored, commented on, published, modified, or otherwise is associated with the user content.

Some implementations can display a user identifier in an electronic messaging communication interface displayed on the first device. For example, in an asynchronous text chat or email thread with the second user where there may be delayed responses by the users, each entry or contribution of text (or image) from the second user in the chat or thread can be associated with the user identifier of the second user, e.g., by displaying the user identifier at the beginning or end of each text contribution from the second user. A user identifier can similarly be displayed in a video call, chat, or conference to represent a user who has not enabled a video feed. For example, the user identifier can be displayed in place of the video feed. Additional functions can also make use of the user identifier to represent the second user in a displayed user interface.

Some implementations can select and display a single image of the motion clip of the user identifier (e.g., the first image of the motion clip, the last image, a highest scoring image of the motion clip, e.g., as described for FIG. 3, the first image of the motion clip having a score over a particular threshold, etc.). In some examples, the selected single image of the motion clip can be displayed if the animation is not desired to be displayed (e.g., some examples of which are described below for FIGS. 5-8). In another example, the single image can be displayed to represent the user on a display under one or more particular conditions. For example, such conditions can include the associated user talking during a video communication, e.g., so that the animation of the motion clip is not confused or un-synced with the words being spoken by the user in the video communication.

FIG. 3 is a flow diagram illustrating an example method 300 to select a set of images to be included in a motion clip used for a user identifier. For example, method 300 can be used for at least part of block 212 of FIG. 2. Other methods can alternatively be used for block 212.

In block 302, a group of multiple images are selected from the stored images received as part of the video call, e.g., the images stored in block 210 of FIG. 2. The group of images can be any of the stored images in various implementations. For example, in some implementations, all of the images stored from the video call in block 210 can be included in the group of images. In one example, the stored images are stored during an initial period of the video call (e.g., an initial number of seconds, such as 5, 8, etc.), and all of the images in the initial period are selected to be in the group of images. In some implementations, a subset of the stored images are provided in the group of images, e.g., less than all of the stored images of block 210. For example, the stored images can be from an initial 30 seconds of the video call, and the selected group of images can include only images from the initial 8 seconds of the video call.

In block 304, it is determined whether further evaluation is to be performed for selection of a set of images to be used for the motion clip. In some implementations, the group of images selected in block 302 is used as the set of images in the motion clip as described for block 212 of FIG. 2, and no further evaluation is required. In some implementations, the group of images selected in block 302 are a superset of images from which a subset of images are to be selected and used as the set of images in the motion clip.

Whether the further evaluation is to be performed can be determined, in some implementations, based on user input, stored user preferences, default settings, and/or other stored instructions, if appropriate user consent has been obtained. Some implementations can determine whether to perform further evaluation by having the system examine particular characteristics of the group of images and/or the video call. For example, if the group of images depicts particular detected types of content, or lack of types of content, then evaluation can be indicated. In one example, if the system does not detect a face in one or more images of the selected group of images (e.g., within the first particular number of images or first particular number of seconds), then further evaluation can be indicated to be performed, and if a face is detected, then evaluation can be omitted. Other conditions can also be detected, e.g., if the video call involved one or more particular users (e.g., the particular users may prefer their contact indicators to be evaluated), local storage is limited (e.g., evaluation may select fewer and more relevant images to store for the motion clip), the network connection was unreliable during the video call (indicating evaluation is needed to make sure appropriate frames are selected for the motion clip, e.g., showing smooth animation and no or few missing frames, having clarity, resolution, pixelation, or other characteristics satisfying particular thresholds, etc.), and/or other conditions can indicate whether or not to evaluate the group of images.

If no further evaluation is to be performed, then the method continues to block 305, in which the group of images selected in block 302 is provided as the set of images in the motion clip as described for block 212 of FIG. 2. The method then continues to block 314, described below.

If further evaluation is to be performed as determined in block 304, then the method continues to block 306, in which a candidate set of multiple images from the group of images are selected. The selected candidate set of images can be a particular sequence of images, e.g., a particular duration of sequential images when displayed, a particular number of images, etc. In some examples, the candidate set of images can be a sequential subset of images of the group of images.

In block 308, the selected candidate set of images is evaluated to determine a score (e.g., overall score) for the candidate set based on one or more criteria. The score can be based on one or more of a variety of different types of characteristics of the candidate set of images. In some implementations, each type of characteristic can provide its own individual score based on the candidate set of images, and individual scores from the different types of characteristics can be combined (e.g., summed) to provide an overall score for the candidate set of images. In some implementations, different types of characteristics can be weighted differently in the overall score, e.g., based on priorities previously assigned to particular types of characteristics.

For example, one type of characteristic can be types of content features. For example, the images can be checked for particular types of content features that are associated with better scores, e.g., content features considered more desirable for a user identifier. In some examples, content features such as a face can have better scores than other content features, e.g., landscapes with trees, roads, vehicles, objects, or other scenes lacking a face. For example, image detection techniques can be used, e.g., examining images for facial features such as mouth, nose, eyes, etc. using machine learning techniques to detect whether a face is depicted in an image. If consent has been obtained from the second user to perform face detection to identify the second user, then the system can check if a face depicting in the images is of the second user or not, e.g., check for known facial features of the second user. If a depicted face is not of the second user, then those images depicting that face do not score as well (e.g., as highly) since the user identifier will be associated with the second user. In some implementations, images which depict scenes having multiple faces (e.g., a group photo) can be scored worse than images depicting a single face, since the user identifier can be intended to represent a single user. In some implementations, the user identifier may represent a group of users (e.g., to represent a user group of multiple users in a user interface), and in such cases an image depicting multiple faces can be scored better than images depicting a single face.

In some implementations, particular characteristics for a type of content feature can be checked. In some examples, a detected face can be checked for orientation or angular direction, e.g., whether the face is within a particular desired angular range showing the front of the face. In some implementations, a detected face can be checked to determine whether the face is within a particular size range within the borders of the images, e.g., whether the face is too small or too large (other implementations can disregard size of faces and other features and can adjust an image to depict a desired size for display of the motion clip as a user identifier, as described below). A detected face can be checked for facial expressions or emotions based on particular facial features, including smiles, frowns, anger, fright, surprise, neutral emotions, etc., as based on detected shape and spacing of detected facial features including a mouth, eyes, tilt of head, etc. In some examples, a smiling face can be assigned a better (e.g., higher) score than a frowning or angry face. A detected face can be checked for other conditions that may be less desirable, e.g., a threshold amount of time in which the eyes of the face are closed, e.g., causing a worse (e.g., lower) score. In some examples, the system can check for position of content features within the image borders, e.g., whether a detected face or other object is centered within the images (e.g., providing a better score) or is off to one side of the image area (e.g., causing a worse score).

In some implementations, the images can be checked for looping characteristics, and the candidate set of images can be scored in accordance with the characteristics. A looping characteristic can include a characteristic based on how smooth the animation for the candidate set of images is displayed from a final image of the clip sequence to the first image of the clip sequence. For example, if a last frame (or last few frames) of the candidate set of images are very similar to the first frame (or first few frames) of the candidate set, there will not be a large discontinuity or jump in the motion or position of displayed features when the candidate set of images is looped from its final image back to its starting image. In some examples, block 308 can examine the candidate set of images to determine whether the first and last images in the candidate set have more than a threshold difference in their pixel content, e.g., using one or more image similarity measurement techniques. If there is less than a threshold difference, a particular looping score can be assigned to the candidate set, or a looping score that is proportional to the amount of similarity between these images can be assigned to the candidate set. In some examples, one or more features (e.g., faces, objects, or other features) can be detected in the candidate set of images that move with respect to the borders of the images during sequential display of the candidate set of images, and similarity of position of the features within the image borders can be examined between the last image and the first image in the candidate set and scored based on the similarity.

In further examples, the images can be checked for visual image characteristics of one or more pixels of the images that can be associated with particular scores. For example, visual image characteristics can include brightness, saturation, contrast, blurriness or sharpness, color noise, color cast, shadow, highlights, etc. In some implementations, particular thresholds and/or values for these visual characteristics can associated with particular scores. For example, the more blurry an image of the subset is, the worse its score for visual characteristics. Some implementations can provide an individual visual characteristic score for each type of visual characteristic that is examined, e.g., a blurriness score, brightness score, etc. For example, the individual visual characteristic scores can be combined to provide a total or overall visual characteristics score.

In some implementations, visual characteristics of the candidate set can include an amount of motion of one or more image features detected in the candidate set of images. For example, if a detected user's head moves greatly (e.g., over a threshold angular range or a threshold percentage of an image dimension or area) from one side of the frame border to the other, and/or moves partially or completely out of the frame borders, then this amount of motion may be less desirable to make into a user identifier. In one example, a worse score can be assigned to the candidate set having a lot of motion than to other candidate sets in which a user's head has less motion throughout the image sequence. In another example, visual characteristics of the candidate set can include a skew or undesired rotation of the content depicted in the candidate set of images with reference to a desired reference orientation. For example, a rotation of the image content can be determined with respect to a desired horizontal reference orientation (e.g., horizon) based on detected lines or edges of depicted features indicating a particular orientation of the content (e.g., using image edge detection techniques). The greater the skew or rotation, the worse the score that can be assigned.

In some examples, user preferences of the second user (if obtained on the first device with consent of the second user), user preferences of the first user, and/or user input responding to displayed prompts, can cause some candidate set characteristics to score differently or be assigned different weight than in a standard or default characteristics evaluation. For example, the second user (and/or first user) may have a preference for motion clips which depict the second user not smiling, and via one or more facial detection techniques, the system can determine whether a user is smiling in one or more of the images of the selected candidate set of images to provide a correspondingly worse score. In another example, the user(s) may have a preference for showing a change in emotions of a face in a motion clip, e.g., from frowns to smiles or vice versa. Various user preferences of a particular user can relate to user identifiers representing those users, and/or can relate to user identifiers representing other users, e.g., specified users and/or all users.

In some implementations, the system can determine an individual image score to each individual image of the candidate set and combine the individual image scores to determine an overall score for the candidate set of images. Some implementations can determine an individual score for each type of characteristic as described above, where this individual score is determined distinctly for each image of the candidate set. The individual scores for each type of characteristic for each image of the candidate set can be combined to provide the overall score for the candidate set. Some implementations can determine the worst image score (or best image score) found among the images of the candidate set and assign the candidate set that worst (or best) image score as the overall score (or as an overall score for a particular type of characteristic of the candidate set of images). In some implementations, a worst image score can be assigned as the overall candidate set score if that worst image score is present for a threshold number of images of the candidate set. Other scoring techniques can alternatively or additionally be used.

In block 310, it is determined whether there are additional candidate sets to evaluate. In some implementations, another candidate set can be selected that includes one or more of the images in the selected group of images that have not yet been evaluated. For example, the candidate set just evaluated may have included ten images, and another candidate set can be selected with ten images that are shifted one image (or a particular number of images) forward in a sequence of the group of images. In some implementations, a completely different candidate set of images can be selected from the group of images than previously-evaluated candidate sets, e.g., in which all images of the candidate set have not yet been evaluated. Some implementations can determine which images were the worst-scoring individual images in the previously-evaluated candidate set of images, and can select a new candidate set of images from the group of images that do not include those worst scoring images, e.g., shift forward or backward the candidate set of images sufficiently in the sequence of the group of images such that a worst-scoring image is outside the new candidate set. Some implementations can maintain a standard number of images in the selected candidate sets, e.g., all candidate sets have a particular number of images, while other implementations can select differing numbers of images for different candidate sets, e.g., within a specified range indicating a minimum and maximum number of images for the candidate set.

If there are more candidate sets of images to be evaluated, then the method returns to block 306 to select a different candidate set of images from the group of images for evaluation. If there are no further candidate sets of images to be evaluated (e.g., if the number of evaluated candidate sets have equaled a particular maximum, if all of the images of the group of images have been evaluated, if particular combinations of images have all been evaluated, etc.), then the method continues to block 312.

In block 312, the candidate set of images having the best score is selected as the set of images to use for the motion clip. In some examples, the best score can be a best (e.g., highest) overall score of a particular candidate set of images, where the overall score may include contributions from individual scores from the candidate set as in examples described above. In some implementations, scores are not provided for the different evaluated candidate sets of images, and the candidate sets of images can be compared directly based on the results of one or more of the types of characteristics described above. For example, if a looping characteristic is used to select a candidate set of images, then the similarity between the first and last images of different candidate sets of images can be determined and compared, such that the candidate set of images having the greatest similarity between first and last images is selected to be the set of images to use for the motion clip.

In block 314, in some implementations, particular display settings can be defined for the motion clip. In some examples, the display settings can include a display rate (e.g., frame rate) or duration of display for each image of the motion clip. For example, if a target duration for the motion clip is a constant (e.g., 5 seconds, 10 seconds, etc.), then the display rate of the motion clip can be adjusted to display each image in the motion clip for a particular amount of time to achieve the target duration for the motion clip. Some implementations can set different display durations for different images in the clip, as described above, e.g., to speed up or slow down particular portions of the motion clip. In some implementations, the motion clip can be specified as a looping motion clip or a non-looping motion clip. A looping motion clip restarts its display at the first image of the motion clip after displaying the final image of the motion clip. A non-looping motion clip stops displaying changing images after displaying the final image of the motion clip. For example, after stopping, a non-looping motion clip can display the final image, first image, or other stored image (e.g., specified in user preferences) continually. A number of loops which the motion clip will execute, e.g., when the motion clip is newly displayed by a device, can also be specified for the motion clip. For example, one loop, a particular number of loops, or continuous looping without stopping can be specified in the display settings for the motion clip.

In block 316, in some implementations, one or more pixels of one or more images in the motion clip can be modified, and/or one or more images can be added to (and/or subtracted from) the motion clip. For example, if a face depicted in one or more of the images was found to be under a threshold size (e.g., during evaluation of block 308), then one or more outer areas of the images surrounding the face can be cropped to cause the face to occupy a larger area of the cropped images. If a face or other object was found to be off-center in the images, then the images can be cropped to center the face. In some implementations, user identifiers for the first device may have a predefined size and/or shape. The images of the motion clip can be adjusted in their size and shape (e.g., image resolution, border dimensions, aspect ratio, etc.) to fit the requirements of a user identifier. Alternatively, one or more of these types of modifications can be made by a user interface when displaying the images, e.g., using graphical overlays covering undesired portions of the images, etc.

In some implementations, one or more images of a motion clip can be modified by being changed in brightness, contrast, hue, blurriness/sharpness, and/or other visual image characteristic. In some implementations, a visual effect can be added to one or more images of the motion clip. For example, a visual effect can be added at the beginning of the sequence of images of the motion clip and/or at the end of the sequence. Some examples of visual effects include the images brightening gradually to a white or other bright color, or darkening to a black or other dark color, e.g., a fade effect. If the display of the set of sequential images loops from the last image to the first image, a fade effect or morph effect can smoothen the transition from the last image back to the first image of the sequence. A fade or morph effect from the last image of the motion clip to the first image of the motion clip can be created, e.g., by at least partially blending these images. In some implementations, a fade effect or morph effect can be provided if the first and last images are within a threshold similarity of each other.

Some implementations can add additional images to the motion clip. For example, one or more new images can be created and added to the sequence to cause a visual effect as described above. Some implementations can provide a forward-backward loop by copying one or more of the images of the motion clip and adding them to the end of the motion clip in reverse sequential order. This causes motion depicted in the sequence of images to move in one way or direction and then move in the opposite way or direction, e.g., after the point of the motion clip which changes from forward motion to backward motion. This can provide a smooth and continuous transition from the last frame of the clip to the first frame in a loop, since the first and last frames can be the same.

Some implementations can add images to the motion clip as interpolated images, e.g., one or more images provided between two adjacent images in the sequence of the motion clip. For example, the interpolated images can depict positions or states of an object, face, or other features that are created between the positions of those features in the two adjacent images using interpolation techniques. In some examples, such interpolation can provide smoother motion, e.g., if original adjacent images of the motion clip depict a large discontinuity in motion. Some implementations can add interpolated images to the end or beginning of the motion clip to provide greater similarity between the first and last frames and thus greater suitability for a looping animation.

Figure 4:
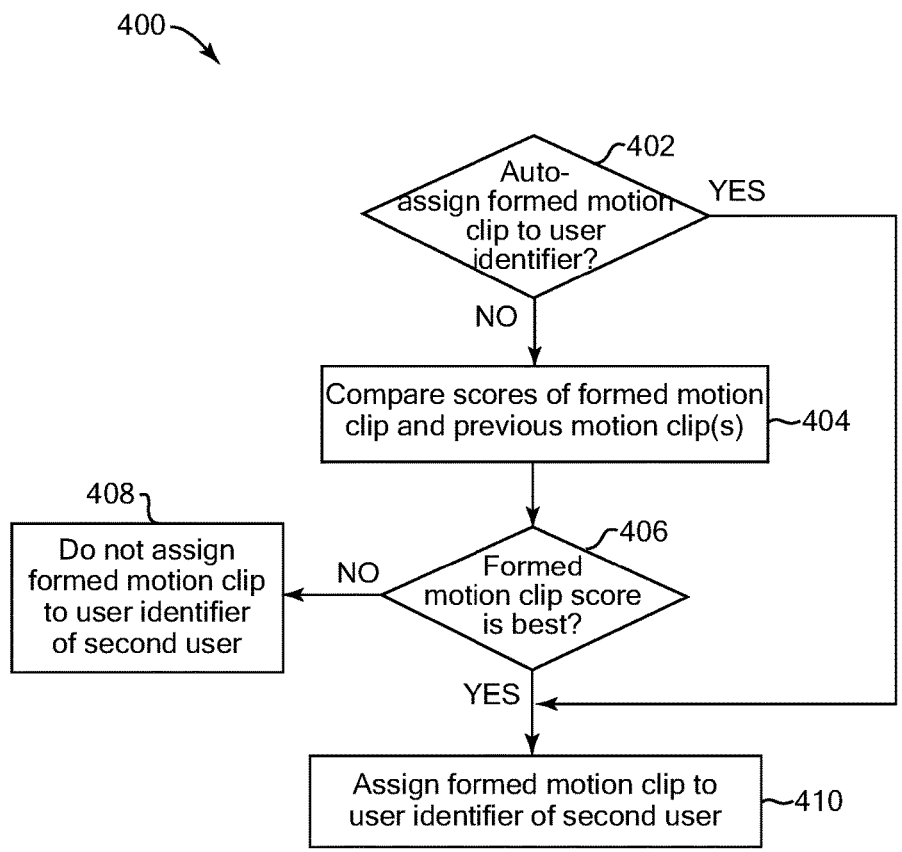
FIG. 4 is a flow diagram illustrating an example method to assign a motion clip to a user identifier of a user, according to some implementations.

FIG. 4 is a flow diagram illustrating an example method 400 to assign a motion clip to a user identifier of a user. For example, method 400 can be used for block 214 of FIG. 2 in which the formed motion clip is assigned to the user identifier of the second user. Other methods can alternatively be used for block 212.

In block 402, it is checked whether the formed motion clip (e.g., the most recently created motion clip) is automatically assigned to the user identifier of the second user. For example, in some implementations, formed motion clips can always be assigned to user identifiers of users. In some implementations, this can be an option controlled by user preferences of the first user and/or the second user (e.g., where such preferences can be received in association with the video call or accessed, with user consent, at a server or other device). In some implementations, other conditions can be checked to determine whether the formed motion clip should be assigned to the user identifier. If the formed motion clip is automatically assigned to the user identifier, then the method continues to block 410, described below.

If the formed motion clip is not automatically assigned to the user identifier, e.g., conditions are to be checked to determine whether the formed motion clip is assigned to the user identifier, then the method continues to block 404 in which the scores of the formed motion clip (e.g., the motion clip most recently formed in block 212) and one or more previously-formed ("previous") motion clips are compared. For example, in some implementations the scores are compared of the formed motion clip and the previous motion clip that was previously and is still assigned to the user identifier of the second user at the time block 404 is performed. In some implementations, scores of multiple previous motion clips can be compared to the formed motion clip, e.g., previous motion clips that were assigned to the user identifier of the second user at some point in the past and are stored on storage accessible to the first device. In some implementations, the scores can be determined similarly as described above with reference to FIG. 3 and, e.g., these scores can be stored in association with the previous motions clips in accessible storage. For example, the scores can be based on one or more particular characteristics of the motion clips, e.g., types of depicted content features, visual image characteristics, looping suitability, etc. Scores can also or alternatively be based on settings, user preferences, or user input similarly as described above. In some implementations, the scores can be determined differently for block 404 than the scores determined for FIG. 3. For example, different conditions can be weighted differently in block 404 than in FIG. 3, different characteristics checked, etc.

In block 406 it is determined whether the score of the formed motion clip is better (e.g., higher) than the score(s) of the previous motion clip(s) to which it was compared in block 404. For example, it can be determined whether the formed motion clip has the best score. If not, in block 408 the formed motion clip is not assigned to the user identifier. This can cause the most recently-assigned previous motion clip to remain assigned to the user identifier of the second user. In some examples, the formed motion clip can be discarded, deleted, or stored for possible later comparisons. If the score of the formed motion clip is better than the score(s) of the previous clip(s), then block 410 is performed.

Block 410 can be performed after block 402 or a positive result of block 406. In block 410, the formed motion clip is assigned to the user identifier of the second user. For example, any previous motion clip assigned to the user identifier is replaced by the formed motion clip.

Some implementations can provide additional or alternative conditions to determine whether the formed motion clip (e.g., most recently formed motion clip) is to be assigned to the user identifier of the second user. In some examples, a time period or time limit can be assigned to a particular motion clip that has been assigned to the user identifier, and after the time period has expired since that assignment, a more recent motion clip is automatically assigned to the user identifier in place of that expired motion clip (e.g., if a more recently-created motion clip is available). User preferences of the second user and/or the first user (and stored in storage accessible to the device(s) implementing the method 400), or user input received in response to displayed prompts, can cause the formed motion clip to be assigned to the user identifier even if that motion clip has a worse score than one or more previous motion clips that were previously assigned (e.g., if the scores do not incorporate the user preferences). For example, if the second user (and/or first user) has a stored preference for user identifiers depicting users that do not wear a hat, and if a hat is detected in one or more images of the formed motion clip (e.g., using image object detection techniques), then the formed motion clip can remain unassigned to the user identifier of the second user even if it is associated with a better score than the previous motion clip, if the scores do not take that preference into account. Other examples of user preferences for user identifiers representing themselves, for specified users, and/or for all users, can include smiling faces (or non-smiling faces), a particular brightness of the motion clip images, a random selection of one of multiple stored motion clips formed from previous video calls, etc.

Some implementations can allow the first user to manually indicate a motion clip to be assigned to the user identifier, e.g., similar to the override clip described above but specified by the first user instead of (or in addition to) the second user. For example, the manually-selected motion clip can be available on storage of the first device or storage accessible to the first device.

Some implementations can assign multiple different motion clips to be used to represent a single user. For example, multiple different motion clips can be assigned to a particular user identifier for a particular user. In some implementations, multiple different user identifiers can be assigned to a single particular user, where each different user identifier is associated with one or more motion clips. In various implementations, each different motion clip assigned to a user can be displayed under a different set of conditions occurring on the displaying device. For example, the different sets of conditions can include different device contexts, e.g., a particular application having displayed output on a device, a particular type of data (e.g., text, image, video, audio, etc.) or type of user interface feature (e.g., window, icon, menu, etc.) being displayed or otherwise output, or an event occurring (e.g., a received call or text message, an alarm or notification, etc.). In some examples, a first motion clip assigned to the second user can be displayed on a first device as a user identifier to represent the second user if it is determined that the second user is calling the first device. For example, the first motion clip can be displayed in a device context in which the first device rings to indicate that the second user is requesting the call (similarly as described in some examples below). A second, different motion clip assigned to the second user can be displayed in a different device context, e.g., if a contact menu is displayed and the second user's user identifier is displayed within the menu, or if a text chat or other chat session with the second user is being displayed, etc. In some implementations, the second user can provide preferences to indicate which of multiple motion clips are to be used in specified conditions (e.g., specified device contexts of other devices such as the first device). Some implementations can select a random motion clip to display from a set of multiple stored motion clips associated with the user identifier, e.g., in any particular instance in which the user identifier for the second user is to be displayed.

For example, in some of these implementations, blocks 406-410 described above can be used to determine if a formed motion clip will be assigned to a particular user identifier in association with a particular set of conditions, e.g., in place of a previous user identifier that was associated with that set of conditions for that user identifier. Some implementations can enforce a maximum number of motion clips to be associated with each user identifier or user.

Figure 5:
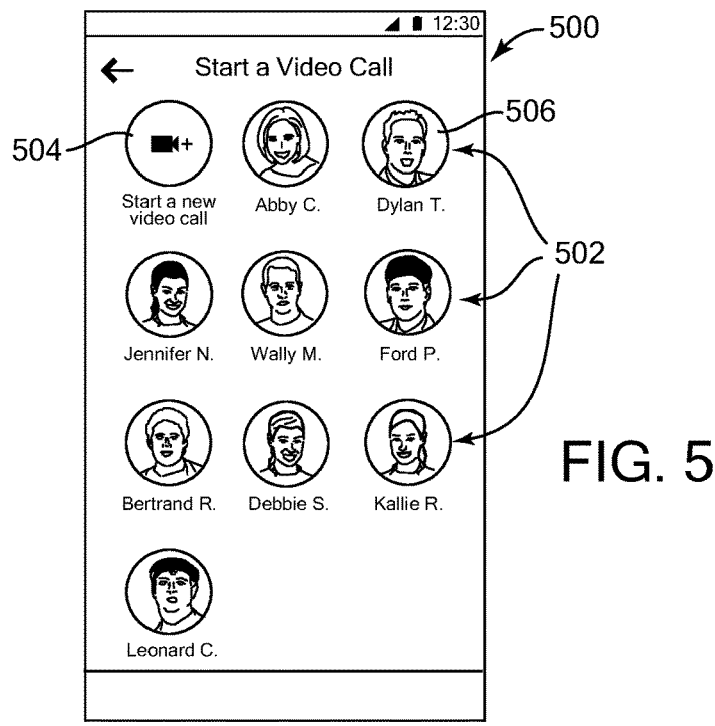
FIG. 5 is a diagrammatic illustration of an example user interface displayed on a display of a device and illustrating one or more features described herein, according to some implementations.

FIG. 5 is a diagrammatic illustration of an example user interface 500 displayed on a display of a device and illustrating one or more features described herein. In some example implementations, an application program running on a device (e.g., client device) can provide the user interface 500 and can display output based on received and determined data and a user's preferences, commands, and/or other input. The user using the interface 500 is referred to as the first user in these examples.

In FIG. 5, user interface 500 displays a video call contact list that displays one or more contact users that can be selected as recipients for a video call initiated by the user (and/or device) of the interface 500. The contact users are represented by user identifiers 502 displayed in the interface 500. Some implementations can display the list of user identifiers in an order based on one or more criteria. For example, user identifiers for users that have most recently communicated with the first user can be displayed closer to the top of the list. Some implementations can display a separate user identifier 502 for each device used by a particular user.

In one example, the user identifiers 502 are displayed as motion clips as described above. Thus, each user identifier 502 is animated by displaying a sequence of images over time in the area defined for the user identifier, where the images are provided in the respective assigned motion clip. In this example, the area defined for the user identifiers is a circular outline in which the images are displayed. For example, the images of the motion clip can be cropped to a circular shape, or an overlay can be displayed in the user interface 500 that covers areas of the displayed images outside the defined circular area. Other implementations can present square- or rectangular-shaped user identifiers or other shapes. A label (e.g., portion of text) can also be associated with each user identifier 502, e.g., a name of the represented user (or other entity or organization) as shown, or a word, phrase, or other label.

As described herein, in some cases or implementations, the motion clips displayed for the user identifiers 502 can display a looping animation, such that the first image frame of the motion clip image sequence is displayed after the last image frame of that sequence. In various implementations, the looping can be continuous so that the user identifier always is displayed in motion while the user identifier is displayed in the interface 500. Some implementations can display a single loop or a particular number of loops and then display a static image for the user identifier after the animation has stopped, e.g., reached the last image of the motion clip. For example, the static image can be the last image of the motion clip, the first image of the motion clip, an image from the clip or from other storage that is selected or designated by the first user (or by the user represented by the user identifier), etc.

In some implementations, only a portion or subset of the displayed user identifiers 502 in the user interface 500 are to be animated in any given period of time. In some cases, this allows particular user identifiers to be highlighted in the user interface, e.g., to assist the first user to find those identifiers. For example, settings or user preferences, stored in storage accessible to the device, can indicate how many displayed user identifiers are to be animated, and/or can specify one or more conditions to determine which of the user identifiers are to be animated on a display or in a contact list.

In some implementations, particular user identifiers can be animated based on the status of the associated users with respect to the first user, e.g., as determined from accessible user data if consent of the respective users has been obtained. In some examples, the interface 500 only displays animations for the user identifiers of the most recent particular number of users (e.g., the last three users) who participated in a video call with the first user and/or the first device. For example, the other, non-animated user identifiers can be displayed as static images, e.g., an image selected from the motion clip or a default image. Other examples can include animating the user identifiers of the users in the contact list who are most frequently contacted by the first user (e.g., based on a threshold frequency indicating number of calls or other communications with the first user device within a period of time), who have one or more particular social connections to the first user (e.g., family of the first user, first degree friends of the first user, members of a particular social group defined in a network service, etc.), and/or other users with a history related to the first user. In another example, the animated contacted identifiers are only for those users who are scheduled to be called by the first user within a particular time period in the future, e.g., as determined based on stored calendar data accessible by the device (if consent of the first user has been obtained). In some implementations, the looping amounts of the user identifiers can be varied, e.g., based on one or more conditions as described. For example, only some of the displayed user identifiers can be displayed as continuously-looping animations, while other identifiers can be displayed with a single loop or having loops of a small number (e.g., two to five loops).

In some implementations, a display rate of the motion clip images (e.g., duration of motion clip or animation speed) for the user identifiers can be varied among different user identifiers. In some examples, the display rate can be based on one or more of a variety of factors. For example, stored device settings and/or user preferences can indicate one or more conditions to determine the respective display rates of motion clips for user identifiers. For example, the display rate or speed of a motion clip can be based on a degree to which the associated user meets one or more of the conditions. Some implementations can provide a display rate based on a status of the associated user with respect to the first user, e.g., similarly as described above. In some examples, a higher display rate can be associated with a higher importance or familiarity of the contact user to the first user. For example, the contact users who most frequently called or otherwise communicated with the first user can be associated with user identifiers displayed at the maximum motion clip display rate, contact users who communicated with a mid-range frequency can be associated with user identifiers displayed at a middle display rate, and contact users who communicated with a low frequency can be associated with user identifiers displayed at a very slow display rate or as a static image. In another example, users who are most imminently or urgently in need of being called by the first user can be associated with user identifiers displayed at the highest display rate, with slower display rates for other user identifiers in accordance with reduced urgency to contact the associated other users. Some implementations can display user identifiers as static images or with slower display rates for users having higher importance or familiarity to the first user.

In the example of user interface 500, a new video call icon 504 can be presented as another option for the first user. When selected, the icon 504 causes a different menu or interface to be displayed to allow the first user to input or select a user to call. For example, a field entry and/or keyboard interface can be displayed in response to selecting icon 504 to allow the first user to type in a name of user, e.g., causing a list of users matching the name to be displayed. The first user can select as user from the displayed list to call.

In this example, the first user decides to initiate a video call with a particular user (e.g., second user) represented by user identifier 506. The first user selects the user identifier 506 to initiate the call, e.g., by using a touchscreen, pointer device, voice command, or other input. In some examples, the device receiving the selection (e.g., the device displaying user interface 500) sends out a call request to a second device known to be associated with the second user, e.g., based on address information of the second device stored in association with the user identifier 506. In some implementations, on a display of the second device (not shown), a message can be displayed to inform the second user of the incoming call request. In addition, an animated user identifier associated with the first user can be displayed by the second device in some implementations, e.g., including or based on a motion clip stored on or accessible by the second device and assigned to represent the first user, similarly as described above for motion clips representing the second user. For example, the call request can cause the second device to ring audibly and/or display a call alert on a display screen of the second device for a period of time, and during this period of time (before the second user answers the call) an animated user identifier of the caller (e.g., first user) can be displayed on the second device display screen, e.g., in a window or other display area indicating the incoming call. In other cases, a user identifier for the second user can similarly be displayed on the first device if the second user calls the first device of the first user.

Figure 6:
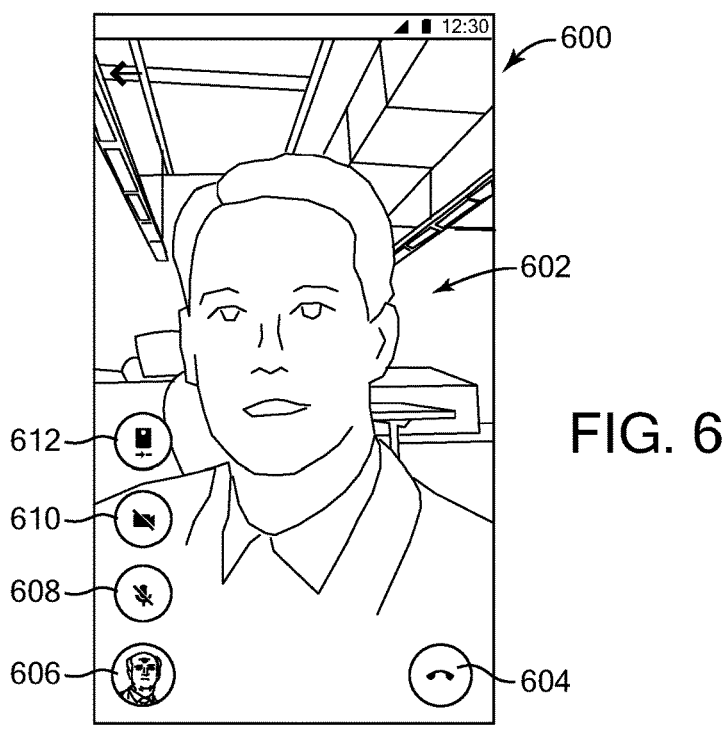
FIG. 6 is a diagrammatic illustration of an example user interface displayed on a display of a device and illustrating an example video call, according to some implementations.

FIG. 6 is a diagrammatic illustration of an example user interface 600 displayed on a display of a device and illustrating an example video call. In this example, the user interface 600 can be displayed in response to the selection of the user identifier 506 by the first user to initiate a video call and in response to the acceptance of the video call by the second user as described above with reference to FIG. 5.

User interface 600 displays a main video feed 602 (e.g., a live video feed) which depicts a scene captured by the remote device participating in the video call (e.g., the second device). For example, the second device associated with the user represented by the user identifier 506 (e.g., the second user) received a call request sent out by the first user's device in response to the selection of the user identifier 506. The second user accepted the request for a video call and, in response, the video call is initiated between the first and second devices. The second device then begins capturing images with a camera of the second device. In this example, the second device captures images over time showing the face of the second user, e.g., using a front-facing camera of the second device that faces the second user. The video feed 602 presents the captured images over time representing the motion of the second user as the video call continues. A microphone of the second device can capture the speech of the second user, and the second device converts the captured speech into audio data that is transmitted to the first device during the call. The audio data is to be output as audio by the first device in synchronization with video feed display of images captured at the time the speech was captured.

User interface 600 can display optional functions to the first user. For example, a disconnect control 604, when selected by the first user during the video call, causes the video call to be discontinued and the video feed 602 to be stopped. A user window 606 can display a live video feed depicting a scene captured by a camera of the first device. For example, a front-facing camera of the first device can capture the face of the first user during the video call. This video feed 602 can be sent to the second device as part of the video call such that the second device displays a video feed 606 of the first user similarly to the video feed 602 of the second user. In other implementations, e.g., a conference video call having multiple parties, each participating user can be displayed in interface 600 in a video feed similar to feed 606.

Mute controls 608 and 610, when selected, cause audio and video, respectively, captured by the first device to be turned off, so that the second device does not receive this data. A camera control 612, when selected, causes a different camera on one of the devices in the call to be active such that images captured from the different camera are displayed for the video feed 602. For example, the first user video feed 606 and second user video feed 602 can be swapped, or a camera on the back side of the second device can be selected to provide images, etc.

Figure 7:
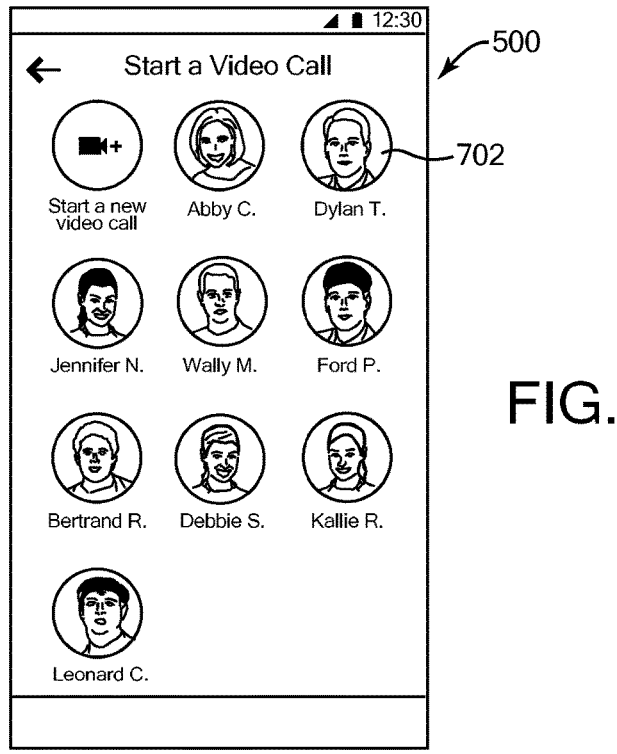
FIG. 7 is a diagrammatic illustration of an example updated user interface after a video call as shown in FIG. 6, according to some implementations.

FIG. 7 is a diagrammatic illustration of an example of an updated user interface 500 of FIG. 5 after a video call has started or occurred as shown in FIG. 6. The first user has commanded the display of the interface 500, e.g., after the video call has been disconnected, or during the video call after some images have been received as part of the video call. In this example, permission was received from the second user to allow formation of a motion clip from the video call of FIG. 6, and images received during the video call of FIG. 6 have been formed into a new motion clip for the user identifier of the second user. The new motion clip has been assigned to the contact indicator 702 for the second user on the first user's device. In the example of FIG. 7, the user identifier 702 is now displayed, which displays an animation based on the new motion clip. The user identifier 506 shown in FIG. 5 was associated with a previous motion clip and is no longer displayed in the interface 500. In various implementations, the new motion clip may have been automatically assigned to the user identifier 702 as the most recent motion clip, may have been compared to the previous motion clip and found to score better, or otherwise determined to replace the previous motion clip, as in examples described herein.

Figure 8:
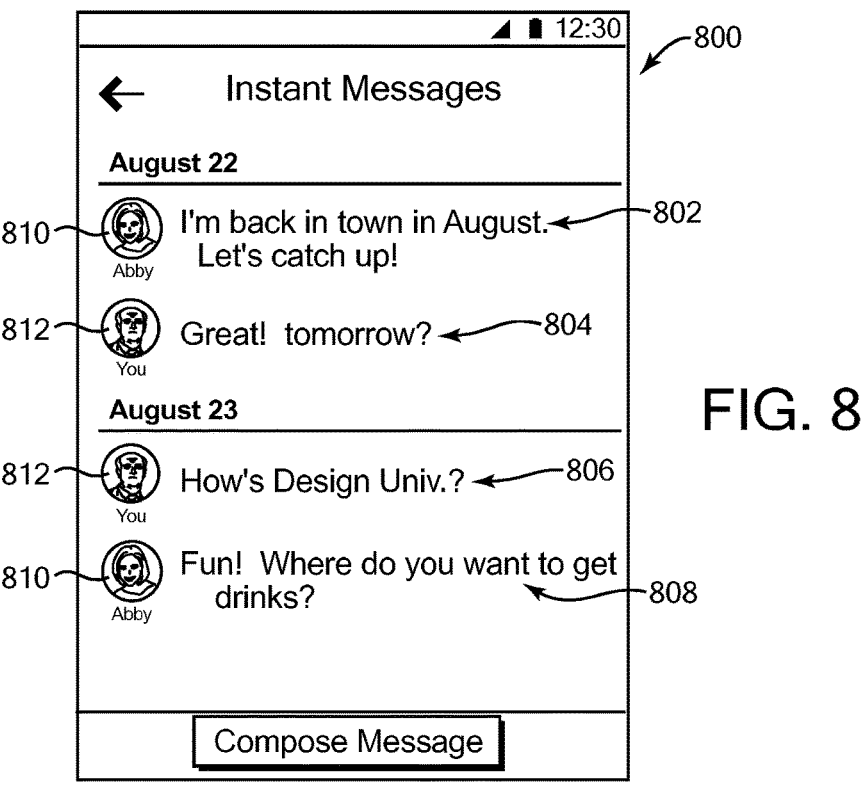
FIG. 8 is a diagrammatic illustration of an example user interface for a messaging function of a device and including one or more features described herein, according to some implementations.

FIG. 8 is a diagrammatic illustration of an example user interface 800 for a messaging function of a device and including one or more features described herein. User interface 800 can be displayed on a display of a device (e.g., client device) to provide functions for an instant messaging or other communication application program running on the device.

User interface 800 shows messages that have been sent from and received by a first device displaying the interface 800 (and/or sent from and received by a user account of a user associated with the device). For example, messages 802 and 808 were received from a particular (e.g., second) user who sent the messages from a second device. Messages 804 and 806 were sent by the first user/first device to the second device used by the second user. Messages 802 and 804 were sent on one day, and messages 806 and 808 were sent on a different day as indicated in the interface 800. The messages can be instant messages, email messages, text messages (e.g., SMS messages over a phone network), or other type of electronic messages.

User identifiers 810 and 812 can be displayed to identify the source user of particular messages and include one or more animated features as described herein. For example, user identifiers 810 represent the second user and are displayed adjacent to messages 802 and 808 sent by the second user. Similarly, user identifiers 812 represent the first user and are displayed adjacent to messages 804 and 806 sent by the first user. The user identifiers 810 and 812 are displayed as animated motion clips formed from previous video calls as described herein.

In some implementations, particular display features can be provided for the user identifiers 810 and/or 812 similarly as described above for the contact list of FIG. 5. For example, particular user identifiers can be displayed at different display rates, and/or with different looping amounts, to highlight particular messages. For example, the display differences can indicate different statuses of the associated users with respect to the first user accessing the interface 800 similarly as described above. In some examples, the user identifiers for the most recently sent messages (e.g., identifiers 810 and 812 for messages 806 and 808) can be animated, or are animated at the highest display rate and/or looping number, compared to user identifiers of older messages (e.g., identifiers 810 and 812 for messages 802 and 804) which can be static images, or animated at a slower display rate and/or looping number.

The blocks and operations described in the methods disclosed herein can be performed in a different order than shown or described, and/or performed simultaneously (partially or completely) with other blocks, where appropriate. Some blocks can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices 120, 122, 124, or 126 as shown in FIG. 1. In some implementations, one or more methods described herein can be implemented, for example, on a server system 102 as shown in FIG. 1, and/or on both a server system and a client system. In some implementations, different components of one or more servers and/or clients can perform different blocks, operations, or other parts of the methods.

Figure 9:
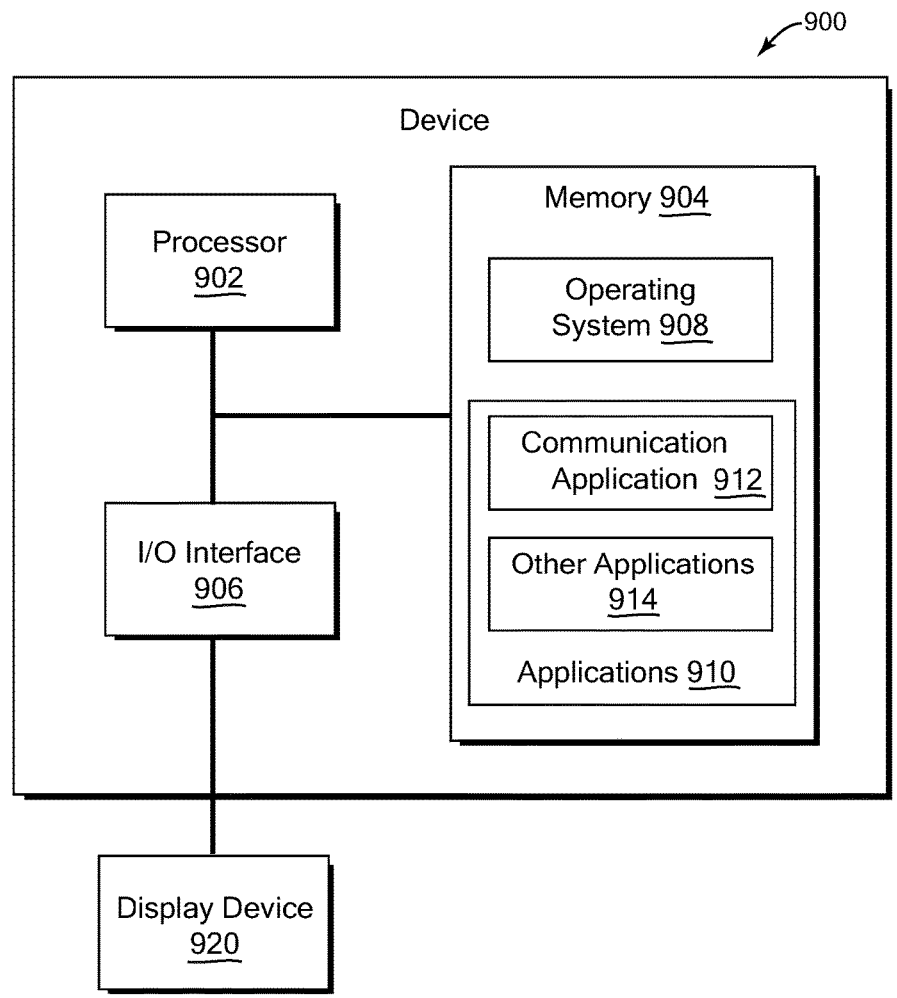
FIG. 9 is a block diagram of an example device which may be used for one or more implementations described herein.

FIG. 9 is a block diagram of an example device 900 which may be used to implement some implementations described herein. In one example, device 900 may be used to implement a computer device that implements a server device, e.g., server device 104 of FIG. 1, and perform appropriate method implementations, or portions thereof, described herein. Device 900 can be any suitable computer system, server, or other electronic or hardware device. For example, the device 900 can be a mainframe computer, desktop computer, workstation, portable computer, or electronic device (portable device, cell phone, smart phone, tablet computer, television, TV set top box, personal digital assistant (PDA), media player, game device, wearable device, remote control, handheld game- or device-controller, etc.).

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 900 includes a processor 902, a memory 904, and input/output (I/O) interface 906. Processor 902 can be one or more processors and/or processing circuits to execute program code and control basic operations of the device 900. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908 and one or more applications 910 such as a data display engine, web hosting engine, image display engine, notification engine, social networking engine, etc. In some implementations, the applications engines 910 can include instructions that enable processor 902 to perform functions described herein, e.g., some or all of the methods of FIGS. 2-4. For example, applications 910 can include one or more communication applications 912, including a program to enable video calls with other devices, store and process images received, and provide output causing display of animated user identifiers on a display device of the device 900. A communication program, for example, can provide a displayed user interface responsive to user input to display selectable options/controls, user contacts, and communicated data based on selected options. Other applications or engines 914 can also or alternatively be included in applications 910, e.g., image editing applications, media display applications, web hosting engine or application, etc. One or more methods disclosed herein can operate in several environments and platforms, e.g., as a stand-alone computer program that can run on any type of computing device, as a web application having web pages, as a mobile application ("app") run on a mobile computing device, etc.

Any of software in memory 904 can alternatively be stored on any other suitable storage location or computer-readable medium. In addition, memory 904 (and/or other connected storage device(s)) can store images, image metadata (including motion clip display settings, etc.), contact information, data structures, and other information, user preferences, and/or other instructions and data used in the features described herein. Memory 904 and any other type of storage (magnetic disk, optical disk, magnetic tape, or other tangible media) can be considered "storage" or "storage devices."

I/O interface 906 can provide functions to enable interfacing the server device 900 with other systems and devices. For example, network communication devices, storage devices (e.g., memory and/or database 106), and input/output devices can communicate via interface 906. In some implementations, the I/O interface can connect to interface devices such as input devices (keyboard, pointing device, touchscreen, microphone, camera, scanner, etc.) and/or output devices (display device, speaker devices, printer, motor, etc.). Display device 920 is one example of an output device that can be used to display content, e.g., one or more images, animations, contact information, etc. provided in a user interface of an output application as described herein. Display device 920 can be connected to device 900 via local connections (e.g., display bus) and/or via networked connections and can be any suitable display device, some examples of which are described below.

For ease of illustration, FIG. 9 shows one block for each of processor 902, memory 904, I/O interface 906, and software blocks 908 and 910. These blocks may represent one or more processors or processing circuitries, operating systems, memories, I/O interfaces, applications, and/or software modules. In other implementations, server device 900 may not have all of the components shown and/or may have other elements including other types of elements instead of, or in addition to, those shown herein. While system 102 is described as performing blocks and operations as described in some implementations herein, any suitable component or combination of components of system 102 or similar system, or any suitable processor or processors associated with such a system, may perform the blocks and operations described.

A client device can also implement and/or be used with one or more features described herein, e.g., client devices 120-126 shown in FIG. 1. Example client devices can include some similar components as the device 900, such as processor(s) 902, memory 904, and I/O interface 906. An operating system, software and applications suitable for the client device can be provided in memory and used by the processor, e.g., video calling software, client group communication application software, etc. The I/O interface for a client device can be connected to network communication devices, as well as to input and output devices, e.g., a microphone for capturing sound, GPS sensor for sensing geographic location, one or more cameras for capturing images or video, audio speaker devices for outputting sound, a display device for outputting images or video, and/or other input and output devices. A display device 920, for example, can be connected to or included in device 900 to display images as described herein, where such device can include any suitable display device such as an LCD, LED, or plasma display screen, CRT, television, monitor, touchscreen, 3-D display screen, projector, or other visual display device. Some implementations can provide an audio output device, such as voice output or synthesis that speaks text.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

One or more systems and methods discussed herein do not require collection or usage of user personal information. In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-executed method comprising:
   determining that a video call over a communication network is connected between a first device associated with a first user and a second device associated with a second user;
   automatically selecting a set of multiple images from a plurality of images received over a communication network by the first device as part of the video call, wherein the set of multiple images is a subset of the plurality of images and is selected based on a time period during the video call in which the set of multiple images is received, wherein the set of multiple images is received in the time period of the video call having a predetermined duration and starting at a predetermined time in the video call relative to a start or end of the video call;
   storing the set of multiple images that is received by the first device as part of the video call;
   generating a motion clip that includes two or more images from the set of multiple images, wherein the two or more images in the motion clip are arranged in a sequence for display;
   assigning the motion clip to a user identifier associated with the second user; and
   causing the motion clip to be displayed on a display screen of the first device to visually represent the second user in response to the user identifier being displayed in at least one user interface on the first device, wherein causing the motion clip to be displayed includes causing the two or more images to be displayed in the sequence at a particular display rate.

2. The method of claim 1 wherein the set of multiple images are fewer than all of the images received sequentially as part of the video call during the time period of the video call.

3. The method of claim 1 wherein the two or more images included in the motion clip from the set of multiple images are fewer than all of the images in the set of multiple images.

4. The method of claim 1 wherein generating the motion clip includes setting the display rate of the two or more images in the motion clip to be different than a display rate of the plurality of images of the video call.

5. The method of claim 1 wherein generating the motion clip includes modifying a visual appearance of at least one image of the two or more images in the motion clip to be different than a visual appearance of the at least one image of the two or more images as displayed during the video call, wherein the modifying includes at least one of:
cropping the at least one image, and
adding a fade effect between one or more pairs of images of the two or more images, wherein the images in each of the one or more pairs are displayed sequentially.

6. The method of claim 1 wherein automatically selecting the set of multiple images from the plurality of images is based on suitability of the set of multiple images as a loop as indicated by a difference in visual content between a first image and a last image of the set of multiple images,
wherein the motion clip includes all images in the set of multiple images, and wherein causing the motion clip to be displayed includes looping display of the sequence of the set of multiple images when displaying the user identifier such that the first image in the sequence of the set of multiple images is displayed after the last image in the sequence of the set of multiple images in a continuous loop.

7. The method of claim 6 wherein the automatically selecting comprises:
determining the difference in visual content between the first image and the last image of two or more candidate image sequences formed from different subsets of the plurality of images; and
selecting images from one of the two or more candidate image sequences having a lowest difference between the first image and the last image as the set of multiple images.

8. The method of claim 1 further comprising automatically selecting the set of multiple images from the plurality of images based on detection of one or more types of content features depicted in the set of multiple images, wherein the one or more types of content features include a face feature.

9. The method of claim 8 wherein the face feature is a human face, wherein the human face is depicted in one or more images of the set of multiple images, wherein the one or more images are received in the time period.

10. The method of claim 1 further comprising automatically selecting the set of multiple images from the plurality of images based on detection of one or more visual characteristics of the plurality of images, wherein the one or more visual characteristics include a threshold amount of motion of a detected object depicted in sequential images in the set of multiple images.

11. The method of claim 1 wherein assigning the motion clip to the user identifier associated with the second user includes assigning a device context in which the motion clip is to be displayed, wherein the device context includes at least one of: the second device calling a device associated with the first user, or the first device displaying a contact menu.

12. The method of claim 11 wherein a different motion clip is additionally assigned to the user identifier associated with the second user, wherein the different motion clip is assigned a different device context in which the different motion clip is to be displayed.

13. The method of claim 1 further comprising determining whether an override clip is received by the first device, the override clip including a second set of multiple images to be displayed in sequence, wherein in response to receiving the override clip, the override clip is assigned to the user identifier of the second user.

14. A system comprising:
a storage device;
a display; and
at least one processor coupled to the display and configured to access the storage device, the at least one processor configured to perform operations comprising:
determining that a video call over a communication network is connected between a first device associated with a first user and a second device associated with a second user;
automatically selecting a set of multiple images from a plurality of images received over a communication network by the first device as part of the video call, wherein the set of multiple images is a subset of the plurality of images and is selected based on a time period during the video call in which the set of multiple images are received, wherein the set of multiple images is received in the time period of the video call having a predetermined duration and starting at a predetermined time in the video call relative to a start or end of the video call;
storing the set of multiple images;
generating a motion clip that includes two or more images from the set of multiple images, wherein the two or more images in the motion clip are arranged in a sequence for display;
assigning the motion clip to a user identifier associated with the second user; and
causing the motion clip to be displayed on the display to visually represent the second user in response to the user identifier being displayed in at least one user interface on the first device, wherein causing the motion clip to be displayed includes causing the two or more images to be displayed in the sequence at a particular display rate.

15. The system of claim 14 wherein the set of multiple images includes fewer than all of the images received sequentially as part of the video call during the time period of the video call.

16. The system of claim 14 wherein the operation of generating the motion clip includes modifying a visual appearance of at least one image of the two or more images in the motion clip to be different than a visual appearance of the at least one image as displayed during the video call, wherein the modifying includes at least one of:
cropping the at least one image, and
adding a fade effect between one or more pairs of images of the two or more images, wherein the images in each of the one or more pairs are displayed sequentially.

17. The system of claim 14 wherein the at least one processor is configured to further perform an operation comprising automatically selecting the set of multiple images from the plurality of images based on detection of one or more visual characteristics of the plurality of images, wherein the one or more visual characteristics include a threshold amount of motion of a detected object depicted in multiple sequential images in the set of multiple images.

18. The system of claim 14 wherein the operation of assigning the motion clip to the user identifier associated with the second user includes assigning a device context in which the motion clip is to be displayed, wherein the device context includes at least one of: the second device calling the first device, or the first device displaying a contact menu, and wherein a different motion clip is additionally assigned to the user identifier associated with the second user, wherein the different motion clip is assigned a different device context in which the different motion clip is to be displayed.

19. A non-transitory computer readable medium having stored thereon software instructions that, when executed by a processor, cause the processor to perform operations including:
   determining that a video call over a communication network is connected between a first device associated with a first user and a second device associated with a second user;
   automatically selecting a set of multiple images from a plurality of images received over the communication network by the first device as part of the video call, wherein the set of multiple images is a subset of the plurality of images and is selected based on a time period during the video call in which the set of multiple images are received, wherein the set of multiple images is received in the time period of the video call relative to a start or end of the video call, the time period having a predetermined duration;
   storing the set of multiple images that are received by the first device as part of the video call;
   generating a motion clip that includes two or more images from the set of multiple images, wherein the two or more images in the motion clip are arranged in a sequence for display;
   assigning the motion clip to a user identifier associated with the second user; and
   causing the motion clip to be displayed on a display screen of the first device to visually represent the second user in response to the user identifier being displayed in at least one user interface on the first device, wherein causing the motion clip to be displayed includes causing the two or more images to be displayed in the sequence at a particular display rate.

20. The non-transitory computer readable medium of claim 19 wherein the operation of assigning the motion clip to the user identifier associated with the second user includes assigning a device context in which the motion clip is to be displayed, wherein the device context includes at least one of: the second device calling the first device, or the first device displaying a contact menu, and wherein a different motion clip is additionally assigned to the user identifier associated with the second user, wherein the different motion clip is assigned a different device context in which the different motion clip is to be displayed.

* * * * *